United States Patent [19]

Takada et al.

[11] Patent Number: 5,095,370
[45] Date of Patent: Mar. 10, 1992

[54] SHEET TRANSPORT APPARATUS OF PRINTER HAVING SCANNER UNIT AND USING MANUAL AND AUTOMATIC SHEET FEEDING MODES

[75] Inventors: Hiromi Takada; Kazuo Aramaki, both of Yokohama; Yasuyuki Nukaya, Tokyo, all of Japan

[73] Assignee: Ricoh Company, Ltd., Tokyo, Japan

[21] Appl. No.: 525,084

[22] Filed: May 16, 1990

[30] Foreign Application Priority Data

May 18, 1989 [JP] Japan ................... 1-124777

[51] Int. Cl.$^5$ ............... H04N 1/23; G03G 21/00; B65H 3/44; B41J 11/50
[52] U.S. Cl. ................... 358/300; 358/496; 358/498; 355/308; 355/309; 355/313; 271/9; 400/605
[58] Field of Search ............... 358/300, 496, 498, 401; 346/134; 355/308, 309, 313; 400/605; 271/9

[56] References Cited

U.S. PATENT DOCUMENTS

| 3,865,482 | 2/1975 | Bendall et al. | 355/308 |
| 3,976,375 | 8/1976 | Kurita et al. | 355/14 |
| 4,419,007 | 12/1983 | Kingsley | 355/313 X |
| 4,639,114 | 6/1987 | Ide | 355/309 X |
| 4,682,879 | 7/1987 | Katoh | 355/3 |
| 4,786,920 | 11/1988 | Igarashi | 355/313 X |
| 4,841,334 | 6/1989 | Fukae et al. | 355/309 X |
| 4,847,656 | 6/1989 | Kuno et al. | 355/313 X |
| 4,912,501 | 3/1990 | Saeki et al. | 355/313 X |

FOREIGN PATENT DOCUMENTS

| 0174113 | 3/1986 | European Pat. Off. . | |
| 0229904 | 7/1987 | European Pat. Off. . | |
| 0076073 | 3/1989 | Japan | 355/309 |
| 2205276 | 12/1988 | United Kingdom . | |

Primary Examiner—Benjamin R. Fuller
Assistant Examiner—Eric Frahm
Attorney, Agent, or Firm—Cooper & Dunham

[57] ABSTRACT

A laser beam printer having a scanner unit and a sheet transport apparatus for use with the scanner unit. The printer includes a sheet feeding part, a photosensitive medium, a transfer part and a scanner unit, the transfer part being provided at an upper portion of the photosensitive medium. The sheet transport apparatus includes an upper transport path for transporting a record sheet from the sheet feeding part to the transfer part of the printer. The sheet transport apparatus further includes a transport path which passes by a position where the scanner unit is provided, the position being adjacent to the upper transport path.

5 Claims, 6 Drawing Sheets

SHEET TRANSPORT APPARATUS OF PRINTER HAVING SCANNER UNIT AND USING MANUAL AND AUTOMATIC SHEET FEEDING MODES

BACKGROUND OF THE INVENTION

The present invention relates to sheet transport apparatus of a printer having a scanner unit in which an upper transport path is provided to extend from a sheet feeding part to an image transfer part arranged over a photosensitive medium.

In general, a printer during operation transports a record sheet from a sheet feeding part to a transfer part through a given transport path, and the transfer part of the printer transfers a visible image formed with toner on a photosensitive medium to the record sheet. The visible image is formed on and carried by the photosensitive medium in accordance with image information. In this type of the printer, the transfer part of the printer is arranged on an upper side of the photosensitive medium, and the sheet feeding part is provided on a lower side of the photosensitive medium. An upper transport path is provided to send a record sheet from the sheet feeding part on a lower side of the printer to the transfer part on an upper side of the printer. This type of the printer is hereinafter referred to as an upper transport type printer.

Conventionally, in order to add a scanner function to the printer, a scanner unit and an image processing unit for processing image readout signals from the scanner unit and sending the signals to the printer are attached to the printer such as the upper transport type printer to constitute an image forming system. In such a conventional image forming system, the printer must be provided with a separate scanner unit and a separate image processing unit. However, there are many inconveniences in using that image forming system to form an image on the record sheet, for example, a need of complicated operations, a bulky system size, and a total cost of the printer, the separate scanner unit and the others becoming unnecessarily high.

SUMMARY OF THE INVENTION

Accordingly, it is a general object of the present invention to provide a novel and useful sheet transport apparatus of a printing apparatus having a scanner unit, in which the above-described problems are eliminated.

Another and more specific object of the present invention is to provide a sheet transport apparatus of a printer having a scanner unit in which an inexpensive cost of the scanner built-in printer and a compact size of the printer are attained.

Still another object of the present invention is to provide a sheet transport apparatus of a printing apparatus which has a sheet feeding part, a photosensitive medium, a transfer part and a scanner unit, the transfer part being provided at an upper portion of the photosensitive medium. The sheet transport apparatus includes an upper transport path for transporting a record sheet from the sheet feeding part to the transfer part, a first transport path which passes by a first position where the scanner unit is provided, the first position being adjacent to the upper transport path. According to the present invention, it is possible to use effectively a space within the printer and incorporate the scanner unit into the printer, attaining an inexpensive cost of the scanner built-in printer and a compact size of the printer.

Other objects and further features of the present invention will be apparent from the following detailed description when read in conjunction with the accompanying drawings.

DESCRIPTION OF THE PREFERRED EMBODIMENTS

Figure 1:
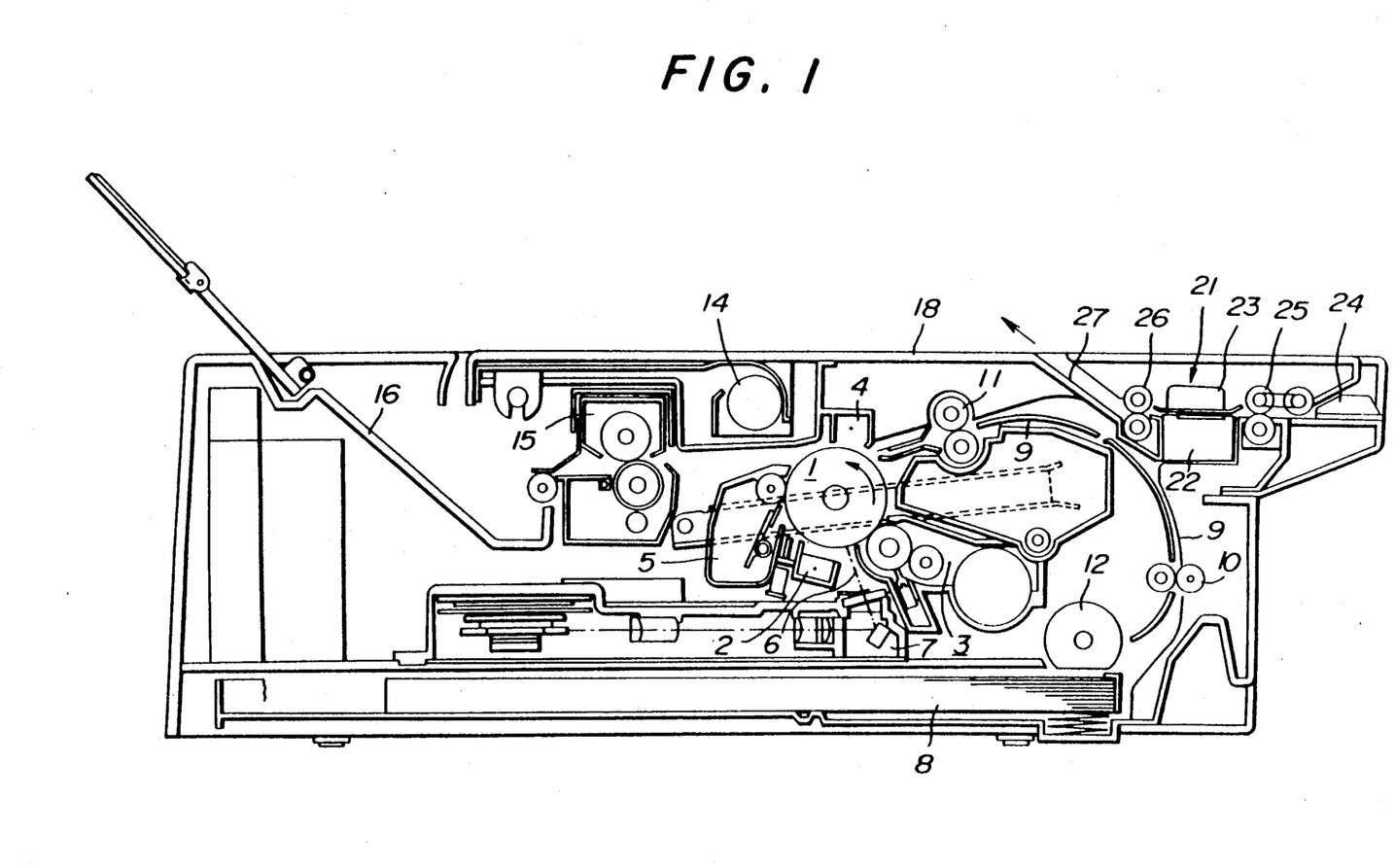
FIG. 1 is a sectional side view of a first embodiment of a laser printer having a scanner unit according to the present invention, which includes a drum type photosensitive medium.

Referring now to FIG. 1, a description will be given of a first preferred embodiment of a laser printer which includes a scanner unit according to the present invention. As shown, a drum type photosensitive medium 1 is provided in the midst of the printer. The photosensitive medium 1 is driven to rotate in a direction indicated by an arrow in FIG. 1 and serves as an electrostatic latent image carrier. Around the drum type photosensitive medium 1, an electrostatic charger 2, a developing unit 3, a transfer charger 4, and a cleaning unit 5 are arranged in this order in the rotating direction of the photosensitive medium 1. The electrostatic charger 2 charges electrostatically a surface of the photosensitive medium 1 in a uniform condition. The developing unit 3 supplies a toner and develops an electrostatic latent image formed on the surface of the photosensitive medium 1 into a visible image with the toner. The transfer charger 4 transfers the visible image produced by the developing unit 3 to a record sheet which is supplied from a sheet feeding mechanism of the printer described below. And the cleaning unit 5 removes residual toner from the surface of the photosensitive medium 1 after the image is transferred to the record sheet. Further, a laser optical path 6 is provided at a place between the electrostatic charger 2 and the developing unit 3. A laser optical system 7 is provided under the photosensitive medium 1, which writes image information on the photosensitive medium 1 to form a latent image thereon. A laser beam sent from the laser optical system 7 passes in the optical path 6 and is cast on the photosensitive medium 1 for the exposure.

The electrostatic charger 2 and the laser optical path 6 are provided under the photosensitive medium 1, and the laser optical system 7 is mounted at a position under the photosensitive medium 1, the developing unit 3 and the cleaning unit 5. The transfer charger 4 is provided over the photosensitive medium 1, and an image transfer part which is formed with the transfer charger 4 is arranged at an upper portion of the photosensitive medium 1. A sheet feeding cassette 8 which serves to accommodate record sheets for sending them to an automatic sheet feeding part is arranged approximately in a horizontal position under the laser optical system 7. An upper transport path 9 extends from an outlet of the sheet feeding cassette 8 to the image transfer part at an upper portion of the photosensitive medium 1.

The upper transport path 9 is formed into a U-shape to surround the developing unit 3, and a pair of intermediate rollers 10 for transporting record sheets are provided near a lower inlet portion of the upper transport path 9. At an upper outlet portion of the upper transport path 9, a pair of registration rollers 11 are provided to control the timing of sheet feeding. The record sheets which are accommodated in the sheet feeding cassette 8 are sent one by one to the lower inlet of the upper transport path 9 by a feed roller 12 which is provided at an outlet of the sheet feeding cassette 8. The record sheet is transported from the lower inlet of the path 9 toward an upper portion of the developing unit 3 by the intermediate rollers 10. The record sheet is further fed to the image transfer part in a synchronous manner with the visible toner image on the photosensitive medium 1 by the registration rollers 11, thereby carrying out the transferring of the visible image.

An adsorption fan 14, a fixing unit 15, and a sheet ejection tray 16 are provided in a record sheet path after transferring is completed. The record sheet to which the visible image is transferred is separated from the photosensitive medium 1 by the brush, and is sent to the fixing unit 15 while being held on the side of the adsorption fan 14. The record sheet to which the visible toner image is fixed by the fixing unit 15 is ejected to the sheet ejection tray 16. This embodiment employs a drum type photosensitive medium as the latent image carrier. Obviously, a belt type photosensitive medium may be used instead, which is described below.

At an upper front portion of the laser printer adjacent to the above-described upper transport path 9, a scanner unit 21 for reading image information of an original is provided. This portion of the laser printer is along the upper transport path 9. An image reading part 22 which is a main component of the image reading scanner unit 21 is provided adjacent to the upper transport path 9. A guide plate 23 is arranged at an upper position which is opposed to the image reading part 22. This embodiment employs a fixed type device for the reading part 22. For example, a contact type sensor or a small-sized type sensor comprising a charge-coupled device (CCD) and an optical system are used for the image reading part 22. On an inlet side of the image reading part 22, an original guide plate 24 is provided to project in a horizontal direction from the printer. And a number of transport rollers 25 are provided between the image reading part 22 and the original guide plate 24. On an outlet side of the image reading part 22, a pair of transport rollers 26 and an original ejecting path 27 are provided so that the original ejecting path extends slantingly upward. A base portion of the original ejecting path 27 is formed so that it is located adjacent to the upper transport path 9. An extension part of the original ejecting path 27 leads to a top surface of an upper cover 18 for the printer.

In this embodiment, the scanner unit 21 is installed in a place which is created within the printer in a case where the upper transport path 9 is formed in the printer. Accordingly, it is possible to make good use of the component parts and space of the printer and at the same time to incorporate the scanner unit in the printer.

Figure 2:
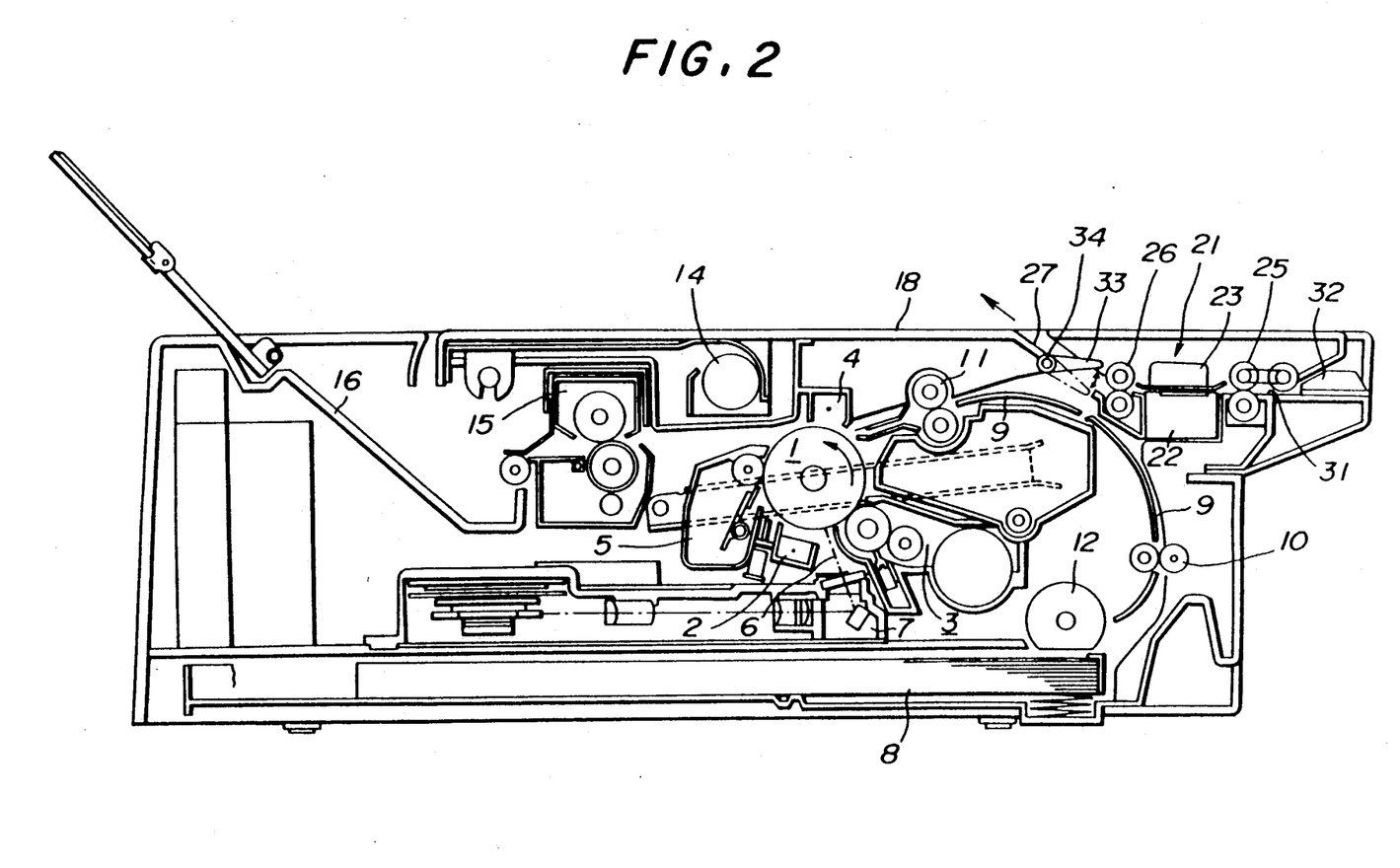
FIG. 2 is a sectional side view of a second embodiment of a laser printer having a scanner unit according to the present invention.

Referring now to FIG. 2, a description will be given of a second preferred embodiment of a printer having a scanner unit according to the present invention in which a manual transport path 31 for feeding manually a record sheet is provided. As shown, a scanner unit 21 for reading image information of an original is installed at an intermediate portion of the manual transport path 31. On an inlet side of the manual transport path 31, or an upper front portion of the printer as shown in FIG. 2, a sheet guide plate 32 is provided. An outlet portion of the manual transport path 31 joins an intermediate portion of the upper transport path 9. In this case, the same guide plate is shared for the sheet guide plate 32 and for the original guide plate 24 of the image reading scanner unit 21 as shown in FIG. 1.

Further, an original ejecting path 27 which guides the original ejected from the image reading scanner unit 21 extends further from a position where the upper transport path 9 and the manual transport path 31 join. At this branch portion of the original ejecting path 27, a path selecting lever 33 which serves as a path selector is provided. The path selecting lever 33 is rotatably supported on a shaft so that the path selecting lever 33 swings between first and second positions. The first position indicated by a solid line in FIG. 2 is selected when a record sheet is transported manually to the upper transport path 9, while the second position indicated by a phantom line in FIG. 2 is selected when an original is transported to the original ejecting path 27. In a manual feeding mode when a record sheet is manually fed to the transfer part of the printer, the path selecting lever 33 is at the first position indicated by a solid line in FIG. 2, and a record sheet from the sheet guide plate 32 one by one is sent to the manual transport path 31. At this time, the image reading scanner unit 21 is in a stop state, and the record sheet passes the scanner unit 21 and is transported to the upper transport path 9 of the printer with the aid of the path selecting lever 33. Meanwhile, in an original reading mode when image information of an original is read by the image reading scanner unit 21, the path selecting lever 33 is shifted downward to the second position indicated by a phantom line in FIG. 2, an original from the manual guide plate 32 one by one is sent to the image reading part 22 so that the image information of the original is read by the image reading part 22. After image reading is done, the original from the image reading part 22 is transported to the original ejecting path 27 leading to the top surface of the upper cover 18, with the aid of the path selecting lever 33.

Figure 4:
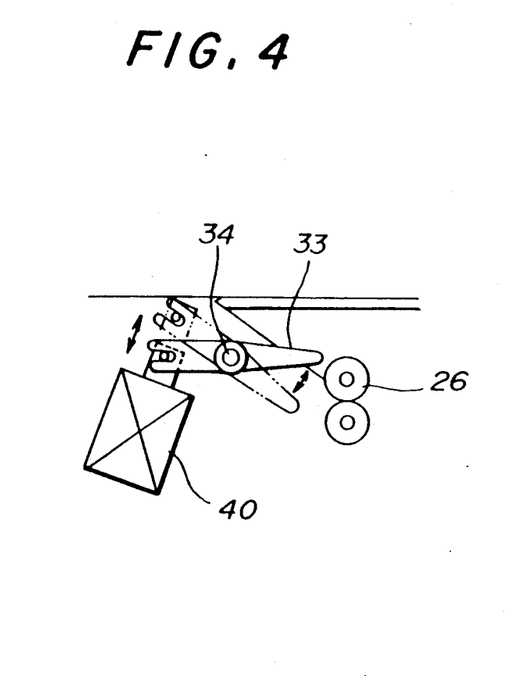
FIG. 4 is a schematic view of a path selecting mechanism.

The swinging motion of the path selecting lever 33 is interlocked with a mode selecting operation which is carried out to select a mode from the manual feeding mode and the original reading mode. FIG. 4 shows an example of an interlocking mechanism used for this purpose. This mechanism employs a magnet 40 which is electrically activated and deactivated for swinging the path selecting lever 33 between the first and second switching positions.

In this embodiment, the scanner unit 21 is installed in a space which is created within the printer in a case where the upper transport path 9 and the manual transport path 31 are formed. Accordingly, it is possible that a space within the printer be effectively used and the scanner unit 21 be incorporated in the printer. It is possible that the sheet transport operation in the manual feeding mode as well as the original transport operation in the original reading mode be accurately and safely performed.

Next, a description will be given of a third preferred embodiment of a laser printer having a scanner unit according to the present invention, by referring to FIG. 3. In this embodiment, an original ejecting path 47 which serves to guide an original from the image reading scanner unit 21 is provided via a pair of registration rollers 11. And, a path selecting lever 43 for selecting a path between the original ejecting path 47 and the upper transport path 9 is supported at a position in the original ejecting path. According to this embodiment, it is possible to obtain the same advantages as the above-described embodiments.

Figure 3:
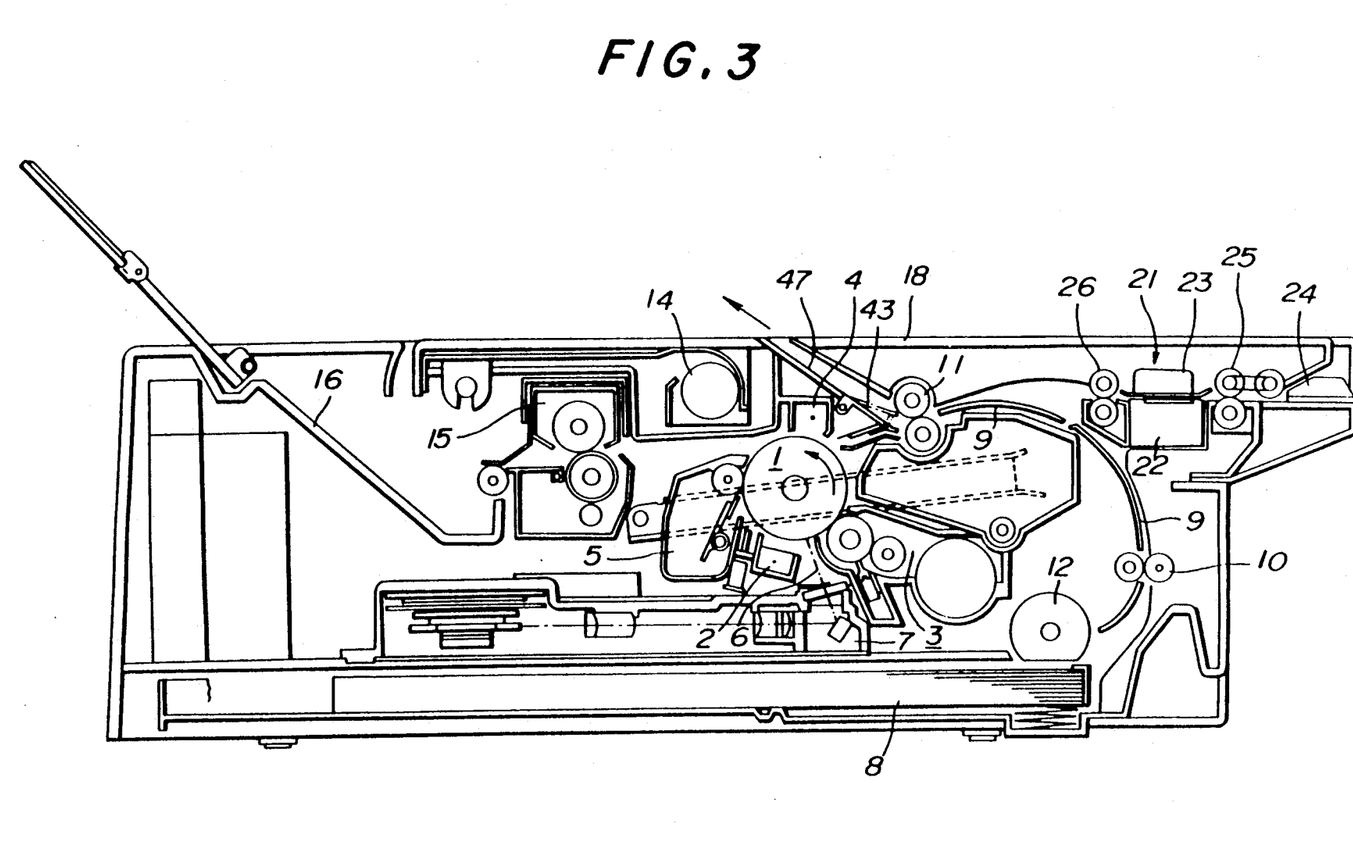
FIG. 3 is a sectional side view of a third embodiment of a laser printer having a scanner unit according to the present invention.

A modified sheet transport apparatus may be used, instead of the third embodiment shown in FIG. 3. In this modified structure, a pair of registration rollers 11 which serve to control the timing of sheet feeding within the printer are in common used by a transport roller for transporting a sheet from the image reading scanner unit 21.

Figure 5:
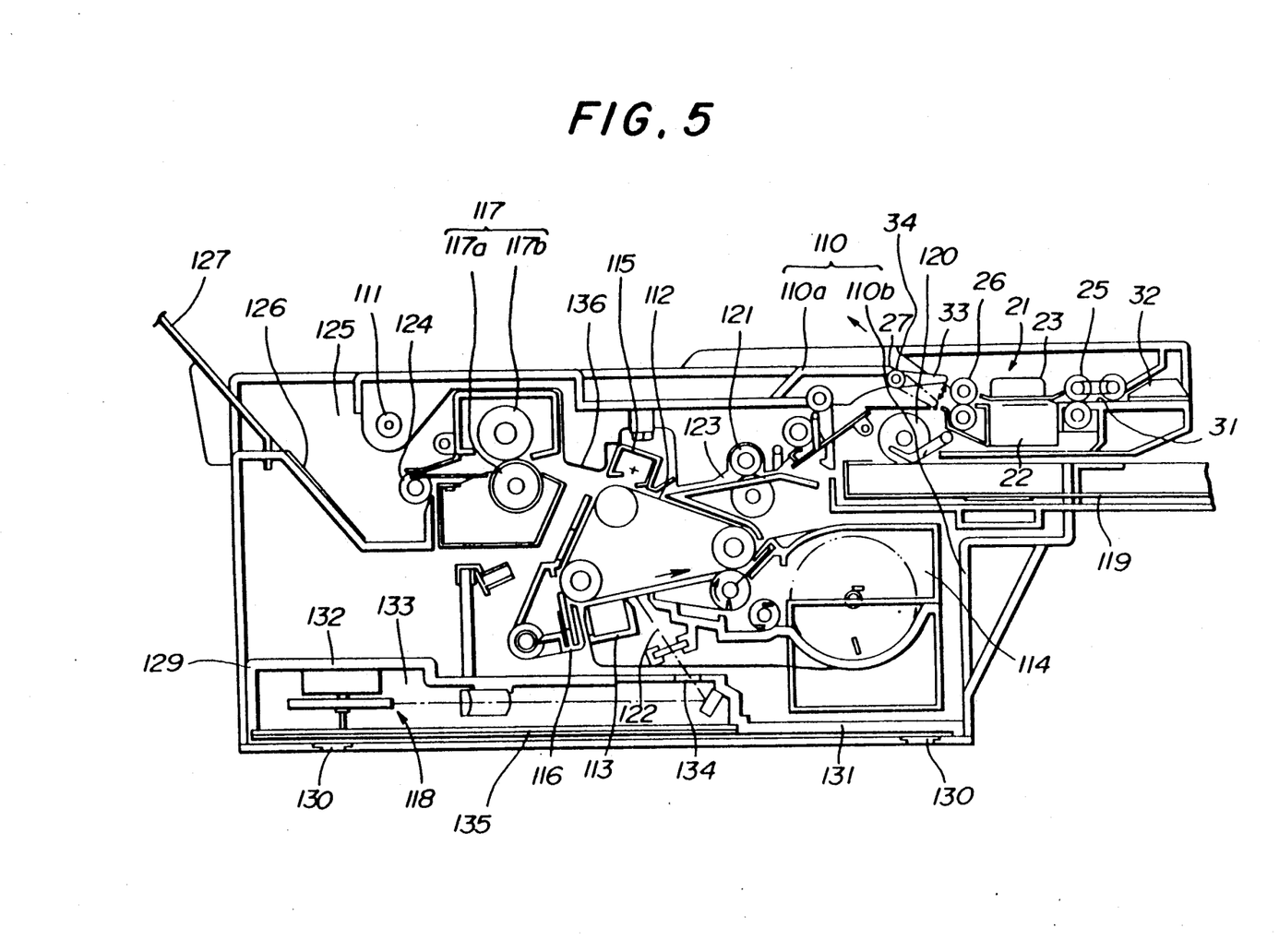
FIG. 5 is a sectional side view of a fourth embodiment of a laser printer having a scanner unit according to the present invention, which includes a belt-driven type photosensitive medium.
Figure 6:
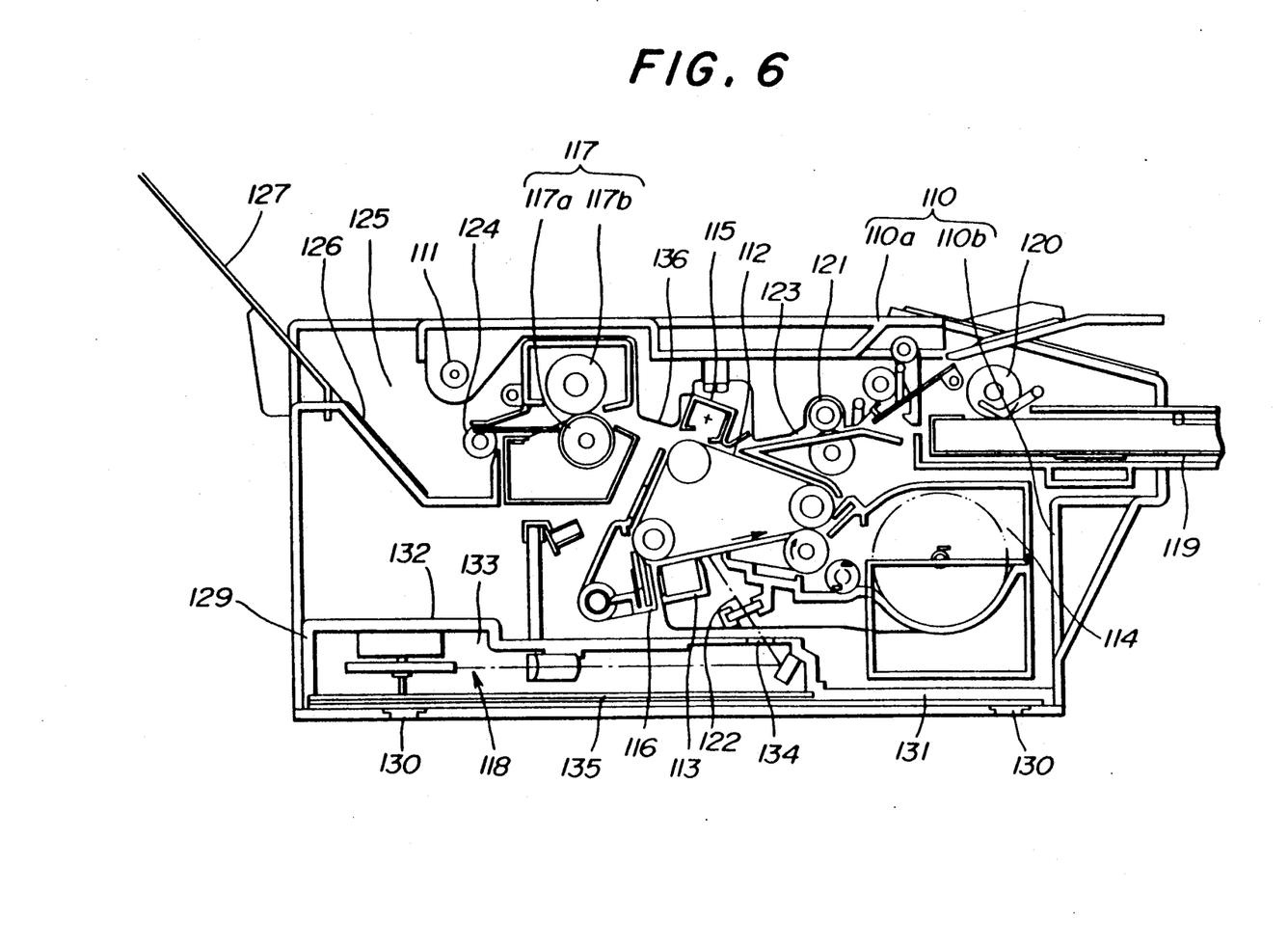
FIG. 6 is a sectional side view of a conventional laser printer having no scanner unit, in which a belt-driven type photosensitive medium is provided.

Next, a description will be given of a fourth preferred embodiment of a printer having a scanner unit according to the present invention, by referring to FIG. 5. FIG. 5 shows the fourth embodiment of a laser printer having a scanner unit in which a belt-driven type photosensitive medium is provided, while FIG. 6 shows a conventional laser printer having no scanner unit. The scanner unit 21 shown in FIG. 5 is generally the same as in the second embodiment shown in FIG. 2.

In the fourth embodiment, a belt-driven type photosensitive medium 112 is employed in a laser printer 110, and a sheet feeding cassette 119 is arranged at an upper front part of the printer 110. The printer 110 is made up of an upper structure 110a and a lower structure 110b. The upper structure 110a is mounted rotatably around a shaft 111 on the lower structure 110b. A belt-driven type photosensitive medium 112 is provided in the midst of the laser printer 110. The photosensitive medium 112 is driven to rotate in a direction indicated by an arrow in FIGS. 5 and 6 and serves as an electrostatic latent image carrier. Around the belt-driven type photosensitive medium 112, an electrostatic charger 113, a developing unit 114, a transfer charger 115, and a cleaning unit 116 are arranged in this order in the rotating direction of the photosensitive medium 112. On an upper front side of these major components of the printer, a sheet feeding cassette 119 is provided. On a lower side of the components, a laser optical system 118 is provided.

A pair of registration rollers 121 are provided to control the timing of sheet feeding. The record sheets which are accommodated in the sheet feeding cassette 119 are sent one by one to a portion of the upper transport path 123 on an upper side of the photosensitive medium 112 by the registration rollers 121. The record sheet is transported to the electrostatic charger 113 and the surface of the sheet is uniformly charged by the electrostatic charger 113. A laser optical path 122 is provided at a place between the electrostatic charger 113 and the developing unit 114. A laser beam sent from the laser optical system 118 passes in the optical path 122 and is cast on the photosensitive medium 112 for the exposure to make a latent image on the surface of the photosensitive medium 112. The latent image on the photosensitive medium 112 is developed with a toner into a visible image when it passes the developing unit 114.

The transfer charger 115 is provided above the photosensitive medium 112, and an image transfer part which is formed with the transfer charger 115 is arranged at an upper portion of the photosensitive medium 112. An upper transport path 123 extends from an outlet of the sheet feeding cassette 119 to the image transfer part at an upper portion of the photosensitive medium 112. The transfer charger 115 transfers the visible image produced by the developing unit 114 to the reverse side of the sheet at an upper portion of the photosensitive medium 112. And the cleaning unit 116 removes residual toner from the surface of the photosensitive medium 112 after the image is transferred to the record sheet.

A fixing unit 117 and a sheet ejection tray 127 are provided in a record sheet path after transferring is completed. The record sheet to which the visible image is transferred is separated from the photosensitive medium 112, and is sent to the fixing unit 117 with the aid of a transport guide 136 and is held between a fixing roller 117a and a pressure roller 117b to fix the visible image. The record sheet which passes the fixing unit 117 is ejected to a sheet ejecting part 125 by a sheet ejecting roller 124. And the record sheet is further fed to the sheet ejection tray 127 with the aid of a sheet ejecting guide 126.

In this embodiment, the laser optical system 118 is provided at a position under a base cover 129 of the printer 110. The base cover 129 is provided at a bottom portion of the printer 110, and a side cover is formed integrally with or separately from the base cover 129. Most of the above-described components of the printer are directly or indirectly supported on the base cover and the side cover. The base cover 129 is made from a heat-insulating thermosetting resin or the like. Transversely extending foot portions 130 are provided in parallel at the bottom of the base cover 129. A flat portion 131 of the base cover 129 is formed to connect the foot portions 130 to the base cover 129. An upwardly projecting portion 132 extends from the flat portion 131 of the base cover 129. Inside the portion 132, a space 133 is formed. And a transversely extending slit 134 is formed in the portion 132 to open to the space 133 which opens to the downward direction. Within the space 133 of the base cover 129, several components of the laser optical system 118 are provided by mounting them on the base cover 129. With the components of the laser optical system 118 installed, a lid plate 135 is mounted to close the downward opening of the space 133.

At an upper corner portion of the laser printer adjacent to the above-described upper transport path 123, a scanner unit 21 for reading image information of an original is provided. This portion of the laser printer is along the upper transport path 123. An image reading part 22 which is a main component of the scanner unit 21 is provided adjacent to the upper transport path 123. A sheet guide plate 23 is arranged at an upper position which is opposed to the image reading part 22. And a number of transport rollers 25 are provided between the image reading part 22 and the original guide plate 32. On an outlet side of the image reading part 22, a pair of transport rollers 26 and an original ejecting path 27 are provided so that the original ejecting path 27 extends slantingly upward. A base portion of the original ejecting path 27 is formed so that it is located adjacent to the upper transport path 123. An extension part of the original ejecting path 27 leads to a top surface of the upper structure 110a of the printer.

In this embodiment, the scanner unit 21 is installed in a space produced in a case where the upper transport path 123 is formed within the printer. Accordingly, it is possible to make good use of the space within the printer and at the same time to incorporate the scanner unit in the printer.

As described in the foregoing, the sheet transport apparatus of the printer according to the present invention includes a path selection means for selecting a path between the upper transport path and the original ejection path, which is provided at a position where said upper transport path and said manual transport path join. Therefore, it is possible to transport safely and accurately the record sheet from the manual transport path to the upper transport path, as well as the original from the scanner unit to the original ejection path, by the use of the path selecting means.

Further, the present invention is not limited to these embodiments but various variations and modifications may be made without departing from the scope of the present invention.

What is claimed is:

1. A printing apparatus with manual sheet feeding and document reading capabilities, comprising:
   a photosensitive medium on which an electrostatic latent image is formed;
   image transfer means for transferring an electrostatic latent image formed on the photosensitive medium to a recording sheet;
   sheet feeding means for feeding a recording sheet to said image transfer means;
   a common sheet transport path which is usable both for sending a recording sheet from said sheet feeding means to said image transfer means and for sending an original document to a document ejecting path; and
   a scanner unit provided at an intermediate portion of said common sheet transport path for optically scanning an original document to read image information from the original document.

2. The apparatus as claimed in claim 1, in which said sheet feeding means is provided inside said printing apparatus and has an outlet inside said apparatus and said common sheet transport path extends from said outlet of said sheet feeding means.

3. The apparatus as claimed in claim 2, wherein said common sheet transport path is provided above said photosensitive medium within the printing apparatus.

4. The apparatus as claimed in claim 3, wherein said common sheet transport path is formed such that said common sheet transport path extends in a horizontal direction within said printing apparatus.

5. The apparatus as claimed in claim 1, further comprising path selecting means provided at an intermediate portion of the common sheet transport path, said path selecting means being switched between a first position and a second position and being arranged for guiding a sheet passing through the common sheet feeding path to the scanner unit when the first position is selected by the path selecting means and is arranged for guiding a sheet passing through the common sheet feeding path to the image transfer means when the second position is selected by the path selecting means, said common sheet feeding path being selectively usable both for sending an original document to the scanner unit and for sending a recording sheet to the image transfer means.

* * * * *